United States Patent [19]

Cresp

[11] 3,933,262
[45] Jan. 20, 1976

[54] METHOD OF HANDLING A PIVOTING CAB OF A PUBLIC WORKS MACHINE AND A PUBLIC WORKS MACHINE APPLYING SAID METHOD

[75] Inventor: Michel M. Cresp, Ormoy-Villiers, France

[73] Assignee: Poclain, Le Plessis Belleville, France

[22] Filed: Jan. 7, 1975

[21] Appl. No.: 539,187

[30] Foreign Application Priority Data
Jan. 15, 1974 France .............................. 74.01315

[52] U.S. Cl. ............ 214/138 R; 180/89 R; 214/152
[51] Int. Cl.² .......................................... E02F 3/32
[58] Field of Search ........... 214/138, 152; 180/89 R, 180/77 S; 296/28 C, 35 R

[56] References Cited
UNITED STATES PATENTS

| | | | |
|---|---|---|---|
| 2,143,983 | 1/1939 | Howell | 180/89 R |
| 3,567,049 | 3/1971 | Guinot | 214/138 R |
| 3,721,077 | 3/1973 | van der Lely | 296/28 C |
| 3,737,192 | 6/1973 | Hirsch | 296/28 C |

Primary Examiner—Robert J. Spar
Assistant Examiner—Ross Weaver
Attorney, Agent, or Firm—Mason, Fenwick & Lawrence

[57] ABSTRACT

This invention relates to a method of handling the driver's cab of a public works machine, said cab being mounted to pivot on the frame (turret) of the machine and this machine comprising a working attachment, mounted on said frame, whose form may undergo a modification.

The pivoting axis of the cab is substantially perpendicular to the plane of deformation of the working attachment, a zone of the cab distinct from the one where the axis is located is coupled, via a sling, to the working attachment and the deformation of the working attachment is controlled so as to displace said coupling zone thus pivoting the cab as desired.

One application of the present invention is the realization of a high power hydraulic shovel.

8 Claims, 3 Drawing Figures

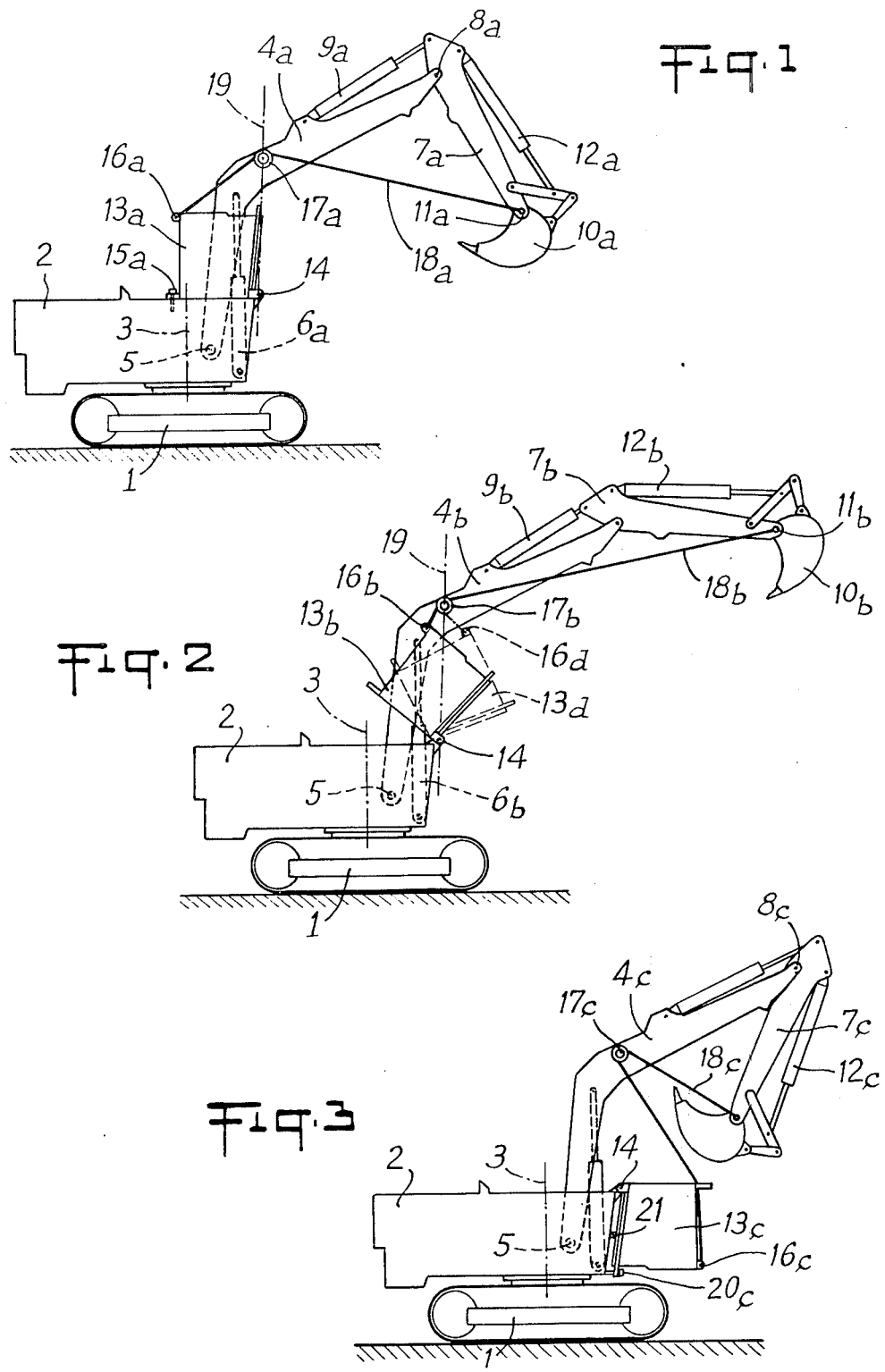

METHOD OF HANDLING A PIVOTING CAB OF A PUBLIC WORKS MACHINE AND A PUBLIC WORKS MACHINE APPLYING SAID METHOD

The present invention relates to a method of handling a pivoting driver's cab of a public works machine and a public works machine employing this method.

In the domain of public works machine, such as hydraulic shovels or cranes, the dimensions and power of these machines are presently on the increase.

The resultant increase in overall size and bulk complicates the problems of transport (particularly concerning the regulation highway gauges) and of driving the machines (lack of visibility).

In an attempt to solve these problems, partly or totally removable cabs, particularly pivoting cabs, have been installed.

However, in view of the weight of such cabs, the pivoting thereof has hitherto had to be controlled by auxiliary handling means such as an independent crane or a special jack for manoeuvring the cab.

The invention firstly seeks to provide a method, of which the novelty resides in the control of the pivoting by employing the actual working attachment of the machine, without having to use auxiliary handling means. Then, in the case of a particular machine already existing, the invention proposes an adaptation thereof to render it suitable for carrying out the above-mentioned method.

It is a first object of the invention to provide a method of handling the driver's cab of a public works machine, said cab being mounted to pivot on the frame of the machine and said machine comprising a working attachment mounted on said frame whose form may undergo a modification.

The pivoting axis of the cab is substantially perpendicular to the plane of deformation of the working attachment, a zone of the cab distinct from the zone where the pivoting axis is located is coupled to the working attachment and the deformation of the working attachment is controlled so as to displace said coupling zone, thus pivoting the cab as desired.

Another object of the invention is a public works machine applying the method mentioned above, of the type comprising a frame, an arm mounted to pivot with respect to the frame about a first axis and supporting the working tool, and a removable cab.

This cab itself being mounted to pivot with respect to the frame about a second axis substantially parallel to the first axis, a fastener device is fast with the cab, disposed at a distance which is not zero from the second axis. A tie connects said fastening to the arm.

The tie is preferably constituted by a flexible connection means whilst a member for guiding said connection means is mounted to rotate with respect to the frame and cooperates with this connection means, disposed substantially near the vertical plane containing the second pivoting axis.

In addition, it is often advantageous if the machine comprises:
 a stop fixed to the frame for limiting the pivoting of the cab;
 members for maintaining the cab in its two extreme configurations, viz, pivoted and non-pivoted.

The invention will be more readily understood on reading the following description with reference to the accompanying drawings, in which:

—FIGS. 1 to 3 show in elevation a hydraulic shovel in accordance with the invention, with its cab and working attachment in three distinct configurations.

Referring now to the drawings, the shovel shown in FIG. 1 comprises a frame constituted by a chassis 1 on endless tracks and by a turret 2 mounted to rotate about a vertical axis 3 with respect to said chassis 1. These elements are found in FIGS. 2 and 3 in the same positions. On the contrary, the various elements which will be described hereinafter have the same references in FIGS. 1 to 3, but the indices a, b or c respectively are attached to these references since their positions vary from one Figure to the other.

In Fig. 1, it is noted that a jib 4a is articulated on the turret 2 about a horizontal transverse axis 5. A jack 6a is coupled between the turret 2 and this jib 4a. A balance beam 7a is articulated on the jib 4a about an axis 8a parallel to axis 5. A jack 9a is coupled between said balance beam and jib. Finally, a bucket 10a is articulated on the balance beam about an axis 11a parallel to axis 5, a jack 12a being coupled between said bucket and balance beam.

A driver's cab 13a is mounted on the turret 2, articulated thereon about an axis 14 parallel to axis 5 and fixed to the turret by screws 15a. An eye 16a is fast with the cab 13a and is disposed near the edge thereof opposite the edge along which axis 14 extends.

In addition, a pulley 17a is mounted to rotate on the jib 4a and acts as guide for a flexible sling 18a which connects the eye 16a to the balance beam 7a, in a zone of this balance beam merged, in the present case, with the axis 11a. The balance beam 7a is half folded with respect to the jib 4a. In addition, the position of the jib 4a is so adjusted that the axis of rotation of the pulley 17a is contained in the vertical plane containing the axis 14.

In FIG. 2, the jib at 4b has remained substantially in the same position as at 4a, as has the pulley 17b. On the contrary, the screws 15a having been removed and the balance beam having been extended to come to position 7b, the axis of articulation of the bucket 10b has itself come to 11b and has drawn the sling 18b which is attached thereto. This sling has itself brought about the movement of the eye, to which its other end is fixed, up to 16b, in a position adjacent the vertical plan 19. The cab has pivoted about its axis 14 and has come to 13b. In this position, a slight manual thrust for example is sufficient to displace the cab again, and it arrives at 13d (broken lines), the eye 16b coming to 16d in a position substantially symmetrical to that of the eye 16b with respect to the vertical plane 19.

From the position 13d of the cab, a control of the balance beam to cause it to fold up into position 7c under jib 4c (Fig. 3) enables the sling to come into position 18c and the cab to pivot completely to position 13c. In this position, the cab is again securely fixed to the turret 2 by means of screws 20c. A rigid stop 21 fast with the turret 2 limits the maximum pivoting of the cab, an elastic stop advantageously being able to cooperate with the stop 21.

As far as utilization is concerned, the retracting maneuvre of the cab has been effected without having to resort to a handling machine independent of the shovel, nor to a special maneuvring member. The adaptation is reduced to the positioning of the pulley 17a, the eye 16a and the sling 18a and is therefore particularly simple and inexpensive.

Furthermore, the execution of the method is very simple. Of course, by proceeding in the reverse order, the cab is brought to its original position (13a) again.

It is to be noted that such a method is applicable not only to a machine such as a hydraulic shovel having a working attachment articulated on a turret, but also to other machines such as for example a crane provided with a telescopic jib. The telescoping of the jib in a plane substantially perpendicular to the axis 14 enables, in fact, the pivoting of the cab to be controlled.

What is claimed is:

1. A method of handling the driver's cab of a public works machine, said cab being mounted to pivot on the frame of the machine and said machine comprising a working attachment mounted on said frame whose form may undergo a modification, wherein the pivoting axis of the cab is substantially perpendicular to the plane of deformation of the working attachment, a zone of the cab distinct from the zone where the pivoting axis is located is coupled to the working attachment and the deformation of the working attachment is controlled so as to displace said coupling zone, thus pivoting the cab as desired.

2. A public works machine comprising a frame, an arm mounted to pivot with respect to the frame about a first axis and supporting the working tool, a movable cab, pivot means connecting said cab to said frame for enabling said cab to pivot with respect to the frame about a second axis substantially parallel to the first axis, fastener means connected to the cab at a location spaced from the second axis and tie means connecting said fastener means to said arm for effecting pivotal movement of said cab by pivoting of said arm as desired.

3. A public works machine as claimed in claim 2, wherein the tie comprises a flexible connection means and additionally including a member for guiding said connection means mounted to rotate with respect to a frame and cooperate with the connection means in a position disposed substantially near the vertical plane containing the second pivoting axis.

4. A public works machine as claimed in claim 2 additionally including members for maintaining the cab in its two extreme configurations, viz, pivoted and non-pivoted.

5. A public works machine as claimed in claim 2 additionally including members for maintaining the cab in its two extreme configuration, viz, pivoted and non-pivoted.

6. A public works machine as claimed in claim 3, additionally including stop means fixed to the frame for limiting the pivoting of the cab.

7. A public works machine as claimed in claim 3, additionally including members for maintaining the cab in its two extreme configurations, viz, pivoted and non-pivoted.

8. A public works machine as claimed in claim 4 additionally including members for maintaining the cab in its two extreme configurations, viz, pivoted and non-pivoted.

* * * * *